March 12, 1957     E. E. SCHNELL     2,784,985
RETRACTABLE SUPPORT FOR TRAILER TONGUES
Filed April 21, 1954     2 Sheets-Sheet 1

INVENTOR.
ERNST E. SCHNELL
ATTORNEYS

March 12, 1957  E. E. SCHNELL  2,784,985
RETRACTABLE SUPPORT FOR TRAILER TONGUES
Filed April 21, 1954  2 Sheets-Sheet 2
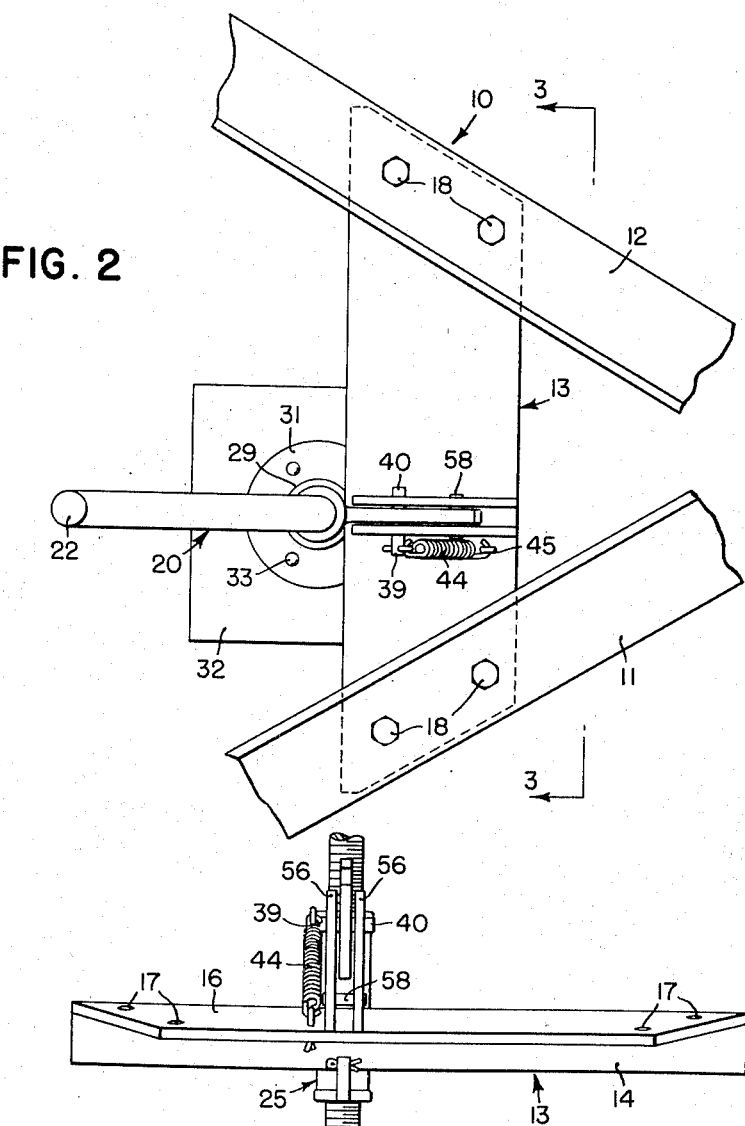
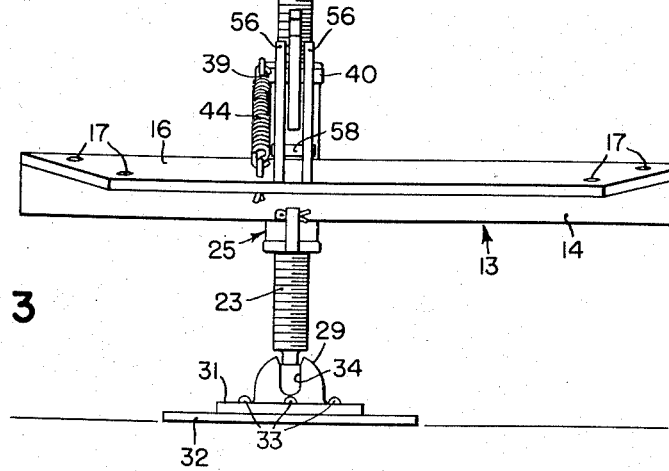
INVENTOR.
ERNST E. SCHNELL
ATTORNEYS ically to agricultural implements and more particularly to retractable tongue supports for draft frame supports, as for implements, vehicles, and the like.

United States Patent Office 2,784,985
Patented Mar. 12, 1957

2,784,985

RETRACTABLE SUPPORT FOR TRAILER TONGUES

Ernst E. Schnell, West Bend, Wis., assignor to John Deere Van Brunt Company, Horicon, Wis., a corporation of Wisconsin Application April 21, 1954, Serial No. 424,725

8 Claims. (Cl. 280—150.5)

The present invention relates generally to agricultural implements and more particularly to retractable tongue supports for draft frame supports, as for implements, vehicles, and the like.

The object and general nature of the present invention is the provision of a retractable support or jack wherein it is simple to raise the tongue support so as to provide for transporting the implement or moving the same across the field in operation.

More specifically, it is a feature of this invention to provide a simple and inexpensive retractable tongue support wherein locking means is provided for holding the support on the implement tongue in either a tongue-supporting position or a retracted or transport position, mainly by the weight of the support unit.

A further feature of this invention is the provision of means acting to hold the tongue support in its operative position, which means is so constructed and arranged that, in case the tractor operator hitches to the implement and moves the latter forwardly without raising the tongue support into a transport position, the tongue support itself will not be damaged.

These and other objects and advantages of the present invention will be apparent to those skilled in the art after a consideration of the following detailed description, taken in conjunction with the accompanying drawings, in which:

Fig. 2 is a plan view of the parts shown in Fig. 1.

Fig. 3 is a front view, corresponding generally to a view taken along the line 3—3 of Fig. 2.

Figure 5:
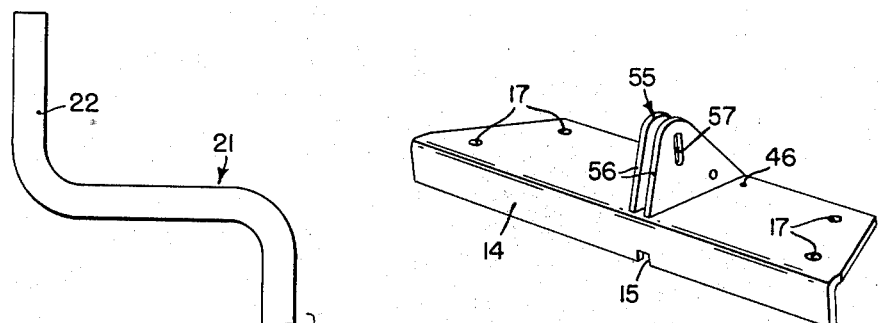
Fig. 5 is a fragmentary perspective view of the tongue-carried supporting bracket that receives the shiftable tongue support unit.

Referring now to the drawings, the principles of the present invention have been shown by way of illustration as incorporated in a hitch jack or retractable tongue support for a grain drill. The draft member or tongue of the grain drill is indicated in its entirety by the reference numeral 10 and comprises a right-hand frame angle 11, a left-hand frame angle 12, disposed at the forward portions in converging relation, and a transverse plate member 13 interconnecting the forward portions of the draft frame angles 11 and 12. The plate member 13 includes along its rearward edge a downwardly extending flange 14 having a generally centrally disposed notch 15. The plate-like member 13 also includes a flat generally horizontal section 16 that is provided at its ends with a plurality of openings 17 to receive the bolts 18 that secure the member 13 to the draft frame angles 11 and 12.

The retractable tongue support, indicated in its entirety by the reference numeral 20, includes a crank screw member 21 having at its upper end a crank section 22 and at its lower portion a screw-threaded section 23. The latter section is disposed within the sleeve section 24 of a bracket member 25, and the lower end of the threaded section 23 is formed as a ball 28 that is mounted for universal movement within a complementarily formed socket 29 that forms a part of a cap 31 to the lower face of which a ground-engaging foot plate 32 is fixed, as by a plurality of connecting bolts or rivets 33. The socket section 29 includes crossed slots 34 to accommodate the neck section 35 at the lower end of the crank screw 21.

Figure 1:
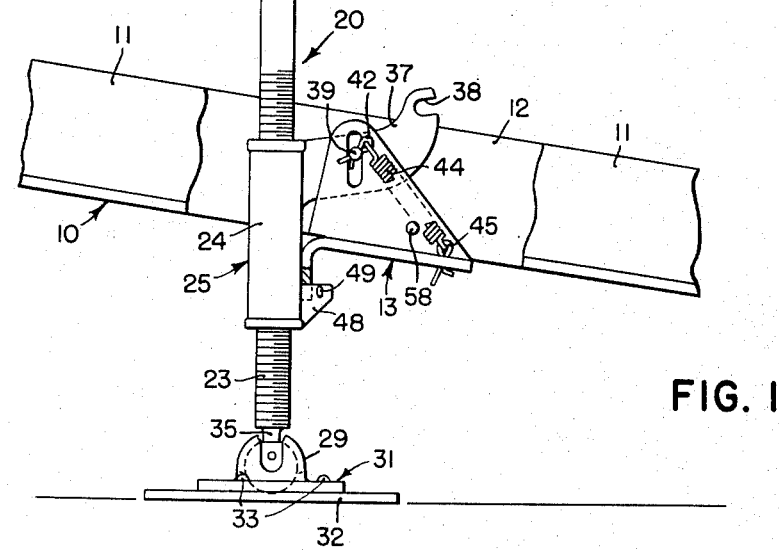
Fig. 1 is a side view of a retractable tongue support for a grain drill, the tongue support being disposed in its tongue-supporting position, certain parts being broken away for clarity.
Figure 4:
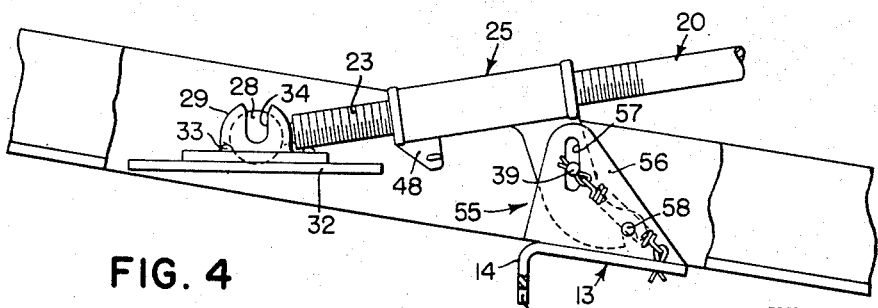
Fig. 4 is a view similar to Fig. 1 but showing the tongue support in its transport or retracted position.

The bracket 25, in addition to the sleeve section 24, includes a forwardly extending arm 37 that at its outer end is formed with a pin-receiving notch 38. Preferably, the member 25 is formed as a casting or the like and the arm 37 is formed integral with the sleeve section 24. Also formed integrally with the arm 37 is a pair of laterally outwardly extending trunnions 39 and 40 that form pivot means for the bracket 25. The trunnion 39 is apertured to receive a cotter pin 42 in the eye of which the rear end of a spring 44 is connected. The other end of the spring is connected by a cotter pin 45 to an opening 46 in the plate section 16. A lug 48, also formed integrally with the sleeve section 24, is disposed at the lower end of the latter and is shaped so as to enter the notch 15 of the cross member 13 when the parts are positioned as shown in Fig. 1. The lug 48 is apertured to receive a pin or the like, such as a cotter pin 49, which serves two purposes. In the first place, when the tongue is supported on the stand, the pin 49 cooperates with the lug 14 to hold the stand in its operative or tongue-supporting position. In the second place, the pin 49 serves as a shear pin in the event that the tractor operator, after hitching onto the implement, drives forwardly without shifting the tongue support into its transport position (Fig. 4). In such a case, the pin 49 is sheared off, but no damage is done to the retractable support itself.

A bracket 55 is mounted on the member 13 and comprises a pair of bracket plates 56 secured, as by welding, to the flat plate section 16 of the member 13. The bracket plates 55 are provided with vertical slotted portions 57 in which the trunnions 39 and 40 are received for pivoting and generally vertical shifting movement. The bracket plates 56 are also apertured, adjacent their base portions, to receive a cross pin 58, best shown in Figs. 1 and 3.

The operation of the present invention is substantially as follows.

Fig. 4 shows a transport or retracted position of the draft member or tongue support, and the latter is held in this position by virtue of the slot 38 in the arm 37 engaging over the pin 58, whereby the weight of the device acts to hold it in its transport position. It will be seen from Fig. 4 that, with the slot 38 engaged over the pin 58, the pins 39 in the slots 57 prevent any pivoting of the retractable support about the axis of the pin 58 and, likewise, the pin 58 and cooperating slot 38 serve to prevent any swinging of the device about the axis of the pins or trunnions 39.

When it is desired to bring the tongue support into an operative position, as shown in Fig. 1, from the inoperative or retracted position, as shown in Fig. 4, all that it is necessary to do is to raise the device upwardly until the slot 38 is freed from its engagement with the pin 58. Then the device may be swung in a counterclockwise direction, as viewed in Fig. 4, until the foot plate 31 engages the ground. It may be necessary to turn the crank 21 in a direction to raise the foot piece 32 an amount sufficient to permit the bracket 25 to lower so that the pin 49 in the lug 48 can pass below the slot 15. Then the crank is turned to raise the sleeve section 25 toward the tongue, making sure that the lug 48 enters the slot 15. By continuing the turning of the crank, the sleeve section 25 moves upwardly along the threaded section 23, raising the draft frame or tongue 10 into the desired supporting position. It will be seen from Fig. 1 that when in the supporting position the bracket 25 is prevented from swinging about the axis of the trunnions 39 and 40 by virtue of the disposition of the lug 48 within the slot 15, with the sleeve section 24 on one side of the flange 14 of the member 13 and with the pin 49 on the other side. The weight of the tongue 10 therefore acts to hold the slot 15 engaged with the lug 48, and this transmits the weight of the tongue to the ground-engaging crank member.

The spring 44 acts primarily in the retracted position (Fig. 4) to hold the bracket 25 with the slot 38 engaged over the pin 58, thus holding the support member against accidental displacement from its retracted or transport position.

While I have shown and described above the preferred structure in which the principles of the present invention have been incorporated, it is to be understood that my invention is not to be limited to the particular details, shown and described above, but that, in fact, widely different means may be employed in the practice of the broader aspects of this invention.

What I claim, therefore, and desire to secure by Letters Patent is:

1. A retractable support for a vehicle tongue or the like, comprising a supporting bracket attachable to said tongue or the like, a second bracket, pin and slot means swingably and shiftably connecting said brackets whereby said second bracket may move generally vertically as well as swing about a generally transverse axis relative to said first bracket, means forming a pair of open end slots, one carried on said supporting bracket and extending generally downwardly, and the other formed on said second bracket and extending generally laterally outwardly therefrom when said second bracket is in a tongue-supporting position, a locking pin carried by said supporting bracket and adapted to receive and support the slotted portion on said second bracket, when the latter is in a transport position, and a lug on said second bracket adapted to be disposed in said downwardly facing slot, when said second bracket has been swung into a tongue-supporting position.

2. The invention set forth in claim 1, further characterized by spring means acting between said brackets for yieldably holding said second bracket in a transport position relative to said first bracket.

3. The invention set forth in claim 1, further characterized by said lug being apertured, and a pin disposed in the aperture in said lug for releasably holding said second bracket in its tongue-supporting position.

4. The invention set forth in claim 3, further characterized by said pin being disposed on the forward side of said lug and serving as a shear pin in case the vehicle tongue is moved forwardly without swinging the second bracket into its transport position.

5. A retractable support for a vehicle tongue or the like, comprising a first bracket attachable to a vehicle tongue or the like and having a generally vertical slot therein, a second bracket shiftably connected with said first bracket and movable relative to the latter into either of two positions, a ground-engaging part adjustably carried by said second bracket, an arm carried by said second bracket, pivot means carried by said arm and disposed in said slot, a first notch formed in said arm, a lug carried by said second bracket, a second notch formed on said first bracket and arranged to receive said lug in one position of said shiftable bracket, and a pin carried by said first bracket and arranged to receive said first notch in the other position of said shiftable bracket.

6. A retractable support as defined in claim 5, further characterized by spring means connected between said first bracket and said pivot means to aid in retaining said shiftable bracket in said other position.

7. A retractable support for a vehicle tongue or the like, comprising a first bracket attachable to a vehicle like and having a generally vertical slot therein, a second bracket shiftably connected with said first bracket and movable relative to the latter into either of two positions, a ground-engaging part carried by said second bracket, an arm carried by said second bracket, pin and slot means connecting said first bracket and said arm and providing for generally vertical and swinging movement of said second bracket relative to said first bracket, a first notch formed in said arm, a lug carried by said second bracket, a second notch formed on said first bracket and arranged to receive said lug in one position of said shiftable bracket, and a pin carried by said first bracket and arranged to receive said first notch in the other position of said shiftable bracket.

8. The invention set forth in claim 7, further characterized by the portion of said first bracket carrying said second notch being disposed on the forward side of said second bracket, and overload release means adapted to hold said lug in said second notch.

References Cited in the file of this patent
UNITED STATES PATENTS

| | | |
|---|---|---|
| 1,193,052 | Pirsch | Aug. 1, 1916 |
| 2,205,436 | Richards | June 25, 1940 |
| 2,571,390 | Strand | Oct. 16, 1951 |
| 2,627,424 | Chapin | Feb. 3, 1953 |
| 2,634,941 | Eckert | Apr. 14, 1953 |

FOREIGN PATENTS

| | | |
|---|---|---|
| 283,663 | Great Britain | Jan. 19, 1928 |
| 645,078 | Great Britain | Oct. 25, 1950 |
| 460,997 | Italy | Jan. 5, 1951 |
| 216,612 | Switzerland | Dec. 6, 1941 |